(12) United States Patent
Rose

(10) Patent No.: US 7,066,442 B2
(45) Date of Patent: Jun. 27, 2006

(54) VALVE

(75) Inventor: Coy W. Rose, Covington, TN (US)

(73) Assignee: Rose Machine & Tool, LLC, Covington, TN (US)

( * ) Notice: Subject to any disclaimer, the term of this patent is extended or adjusted under 35 U.S.C. 154(b) by 57 days.

(21) Appl. No.: 10/995,874

(22) Filed: Nov. 23, 2004

(65) Prior Publication Data

US 2006/0108556 A1 May 25, 2006

(51) Int. Cl.
 *F16K 16/20* (2006.01)
(52) U.S. Cl. .................. 251/149.8; 137/223; 137/231; 137/230; 251/264
(58) Field of Classification Search ............. 251/149.8, 251/264, 273
See application file for complete search history.

(56) References Cited

U.S. PATENT DOCUMENTS

| | | | |
|---|---|---|---|
| 2,390,199 A | 12/1945 | Walsh | |
| 2,473,591 A * | 6/1949 | Killner | 137/234.5 |
| 2,488,456 A * | 11/1949 | Walker et al. | 137/234.5 |
| 2,701,579 A * | 2/1955 | Hasselquist | 137/223 |
| 2,772,692 A | 12/1956 | Russell | |
| 2,804,085 A | 8/1957 | Di Geambeardino et al. | |
| 2,824,570 A | 2/1958 | Silverman et al. | |
| 3,351,081 A | 11/1967 | Bogossian et al. | |
| 3,590,851 A | 7/1971 | Bogossian et al. | |
| 3,785,395 A | 1/1974 | Andreasson | |
| 3,983,907 A | 10/1976 | Sorensen | |
| 4,529,167 A | 7/1985 | Harrison et al. | |
| 4,836,235 A * | 6/1989 | Pagani | 137/223 |
| 4,844,408 A * | 7/1989 | Beaston | 251/149.8 |
| 5,082,244 A | 1/1992 | Krier et al. | |
| 5,111,838 A | 5/1992 | Langston | |
| 6,089,251 A | 7/2000 | Pestel | |
| 6,138,711 A | 10/2000 | Lung-Po | |
| 6,293,297 B1 * | 9/2001 | Maldonado et al. | 137/227 |
| 6,382,268 B1 * | 5/2002 | Lin | 141/67 |
| 6,460,560 B1 | 10/2002 | Weinheimer et al. | |
| 6,508,264 B1 | 1/2003 | Chaffee | |
| 6,622,749 B1 | 9/2003 | Li | |
| 6,719,003 B1 * | 4/2004 | Schroeder et al. | 137/322 |
| 6,880,598 B1 * | 4/2005 | Haunhorst et al. | 152/415 |
| 6,966,331 B1 * | 11/2005 | Simmons et al. | 137/232 |
| 2005/0178437 A1 * | 8/2005 | Schultz | 137/224 |

* cited by examiner

*Primary Examiner*—J. Casimer Jacyna
(74) *Attorney, Agent, or Firm*—Walker, McKenzie & Walker, P.C.

(57) ABSTRACT

A springless valve having a valve body, a valve stem insert, and an O-ring gasket for sealing the insert to a valve seat of the valve body. As the valve stem insert rotates about its axis, fingers on vanes of the insert move within threads of the valve body, and the insert moves between valve-opened and valve-closed positions. A coupling engages with the valve body during inflation/deflation and, as the coupling rotates with respect to the valve body, it engages the insert for mutual rotation to move the insert between the valve-opened and valve-closed positions.

12 Claims, 5 Drawing Sheets

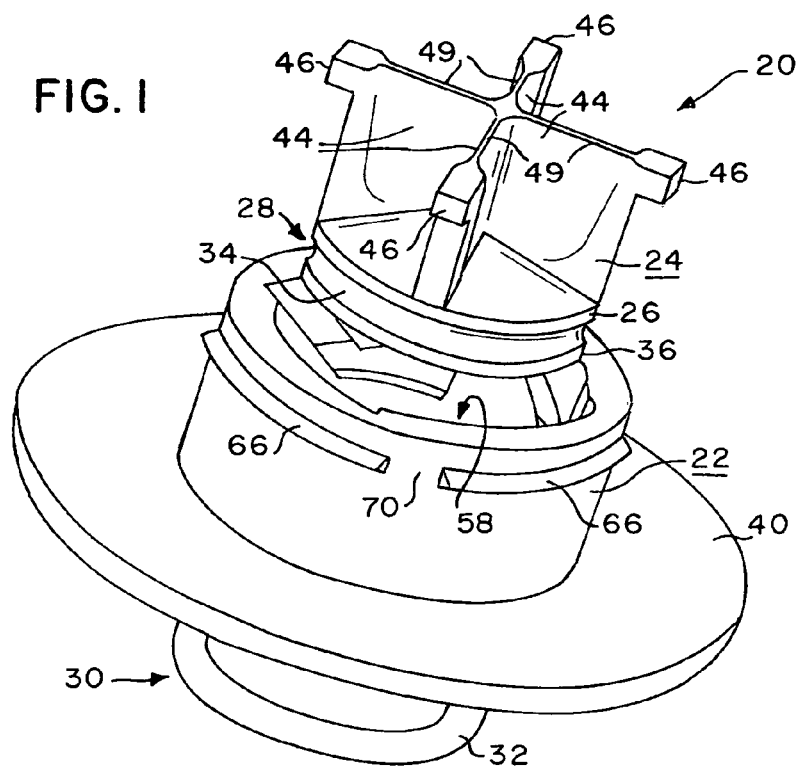
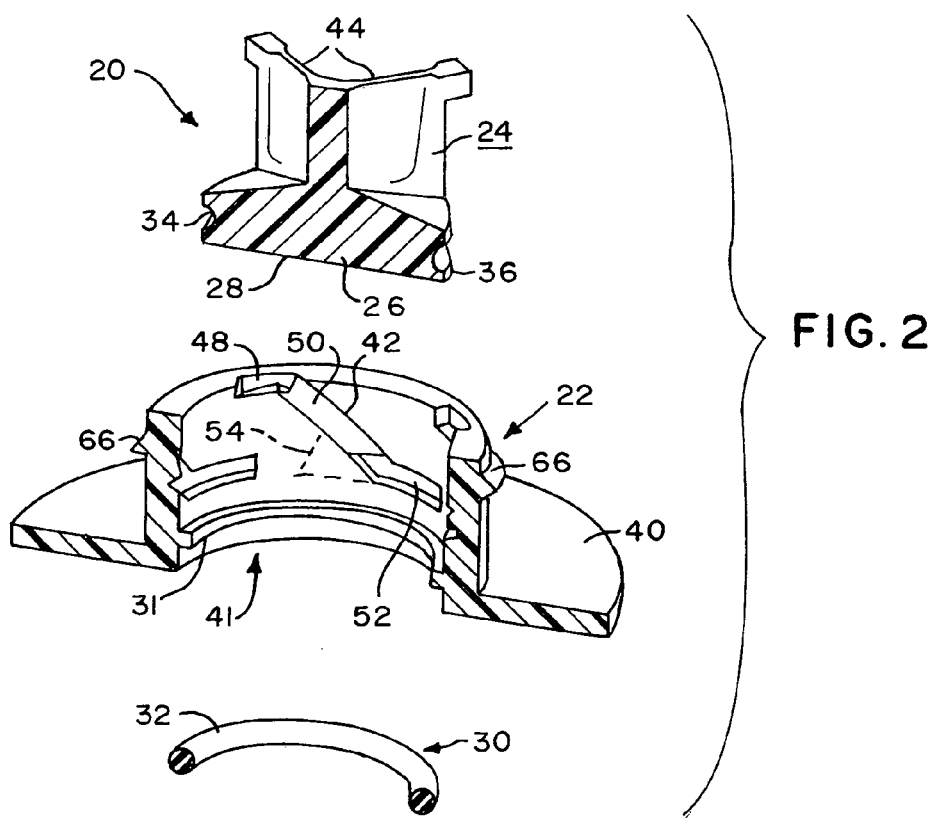

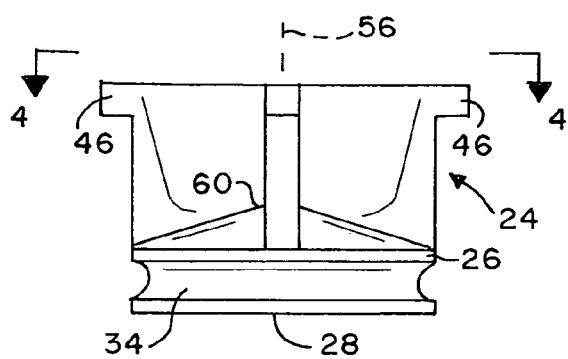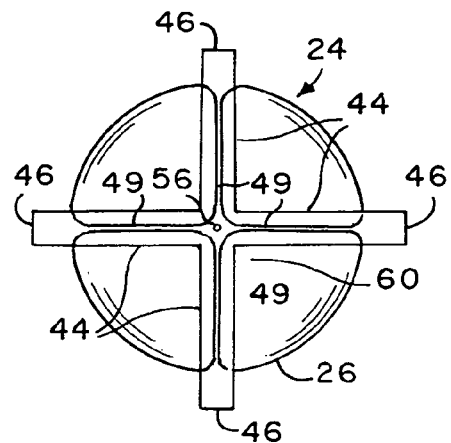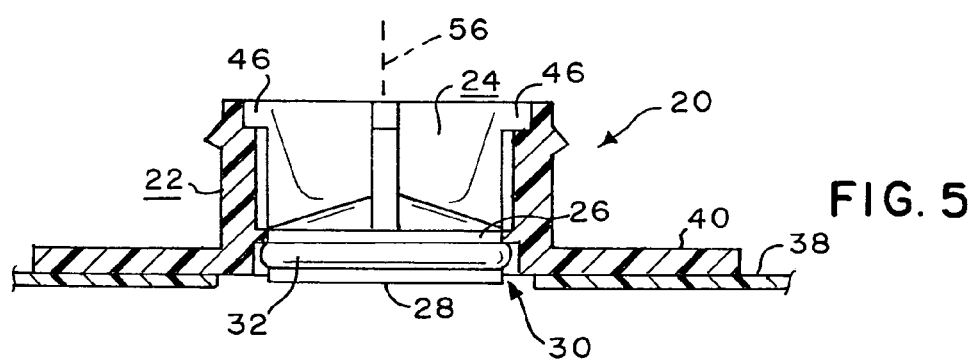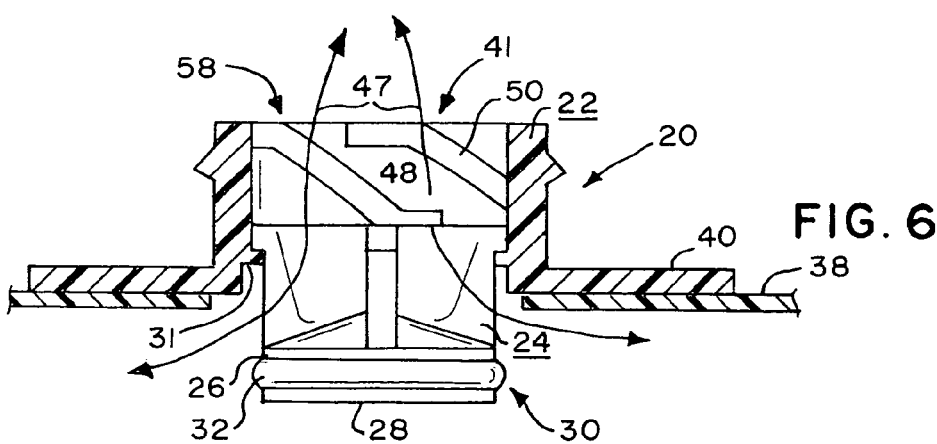

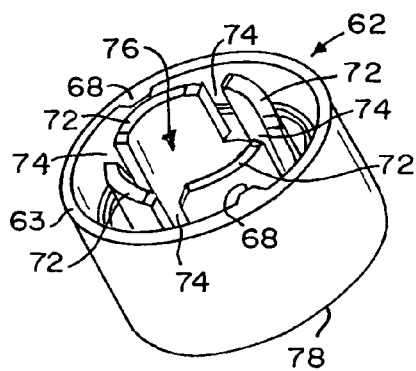
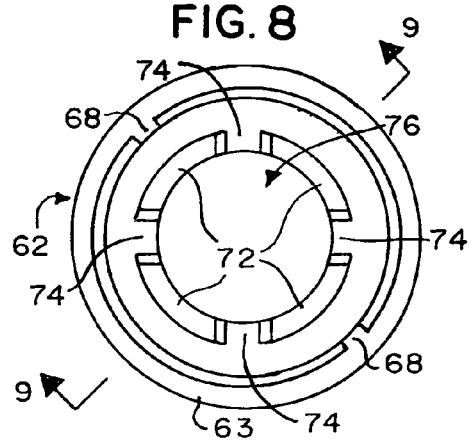
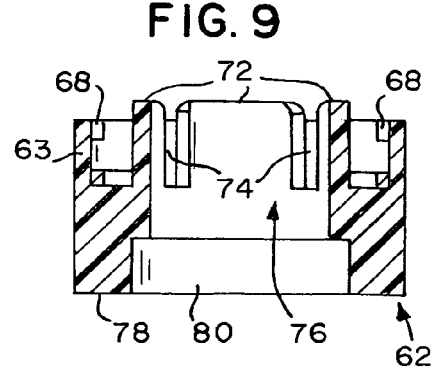
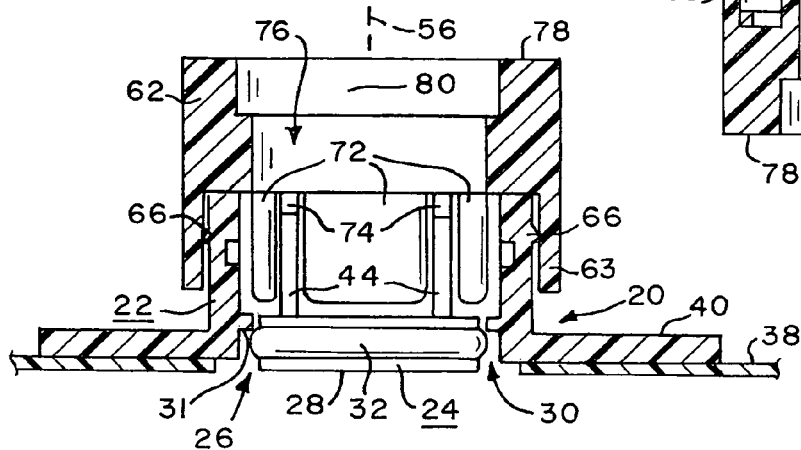
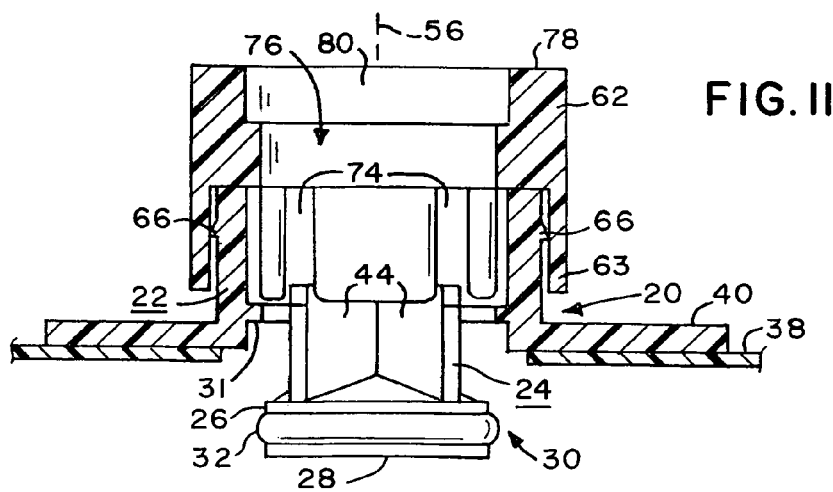

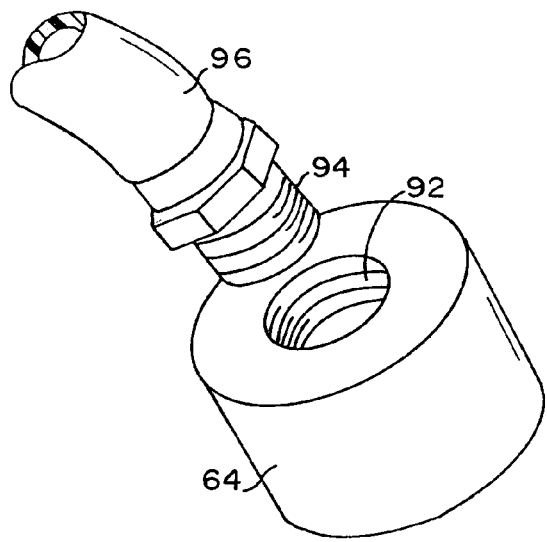
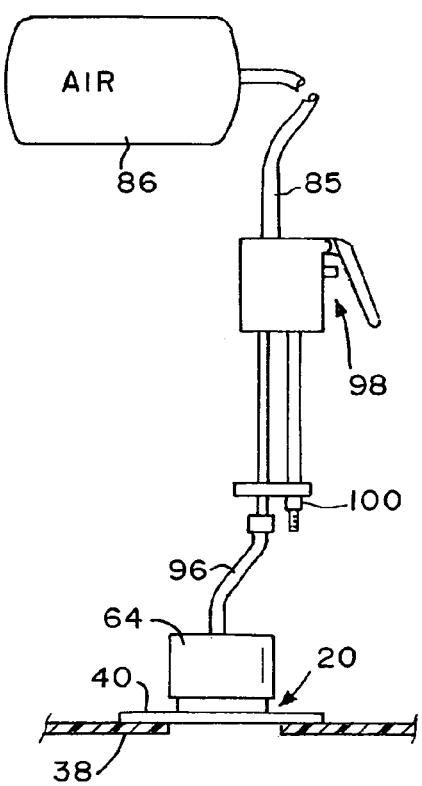
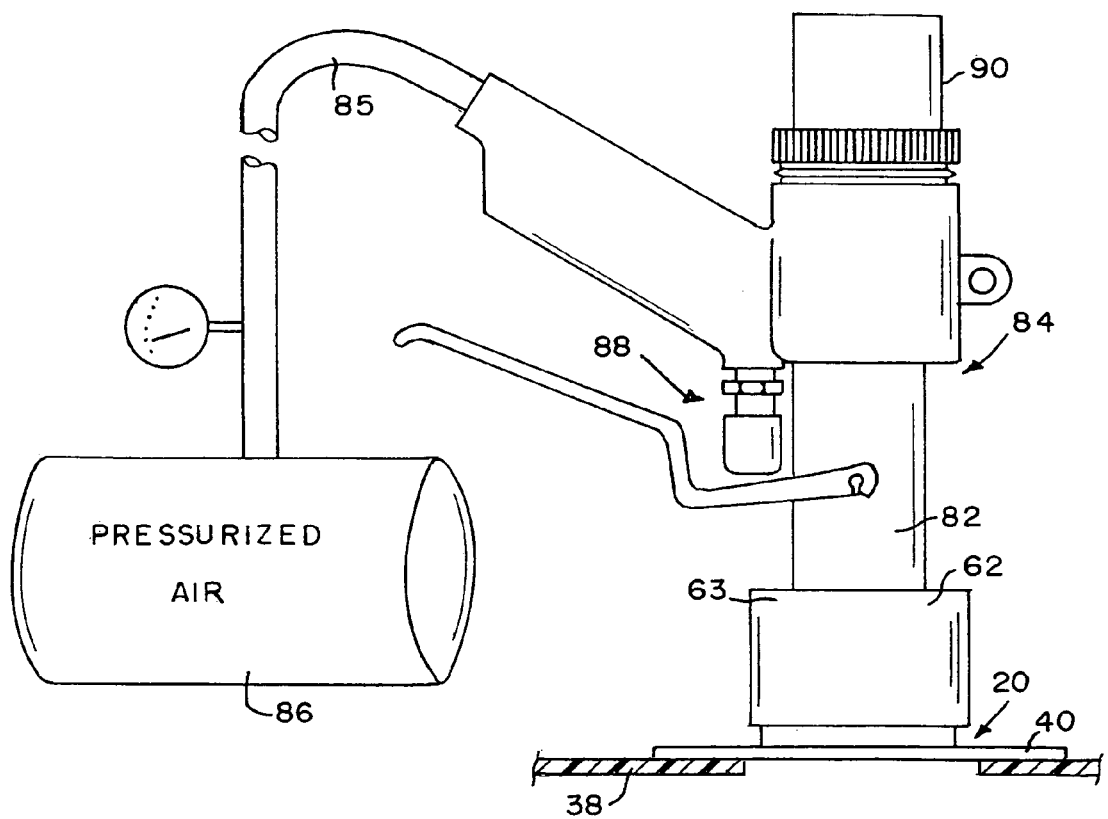

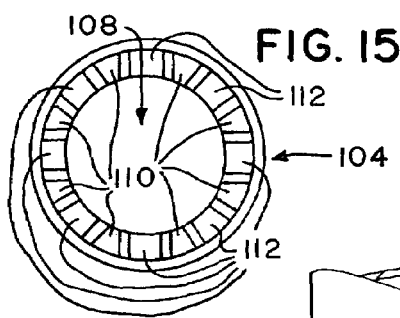
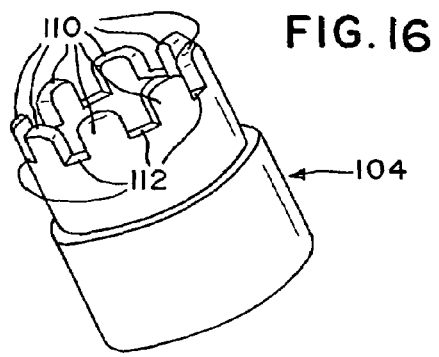
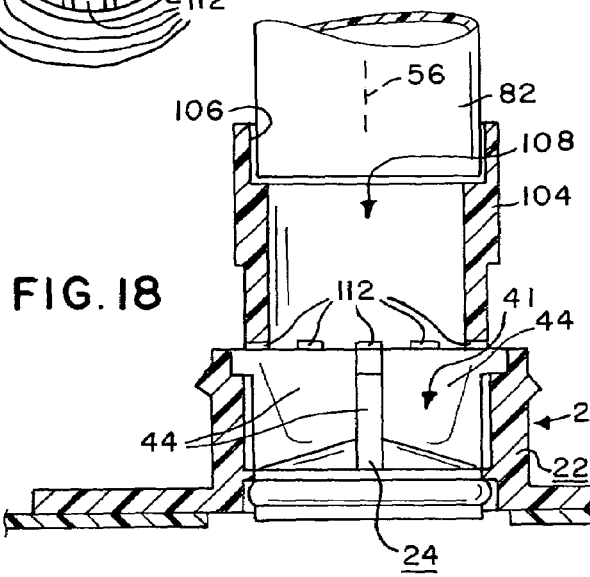
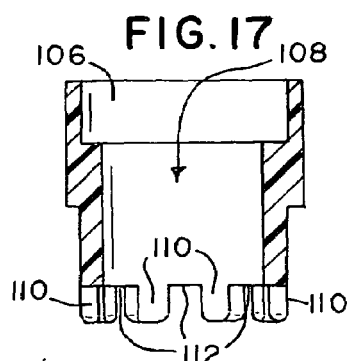
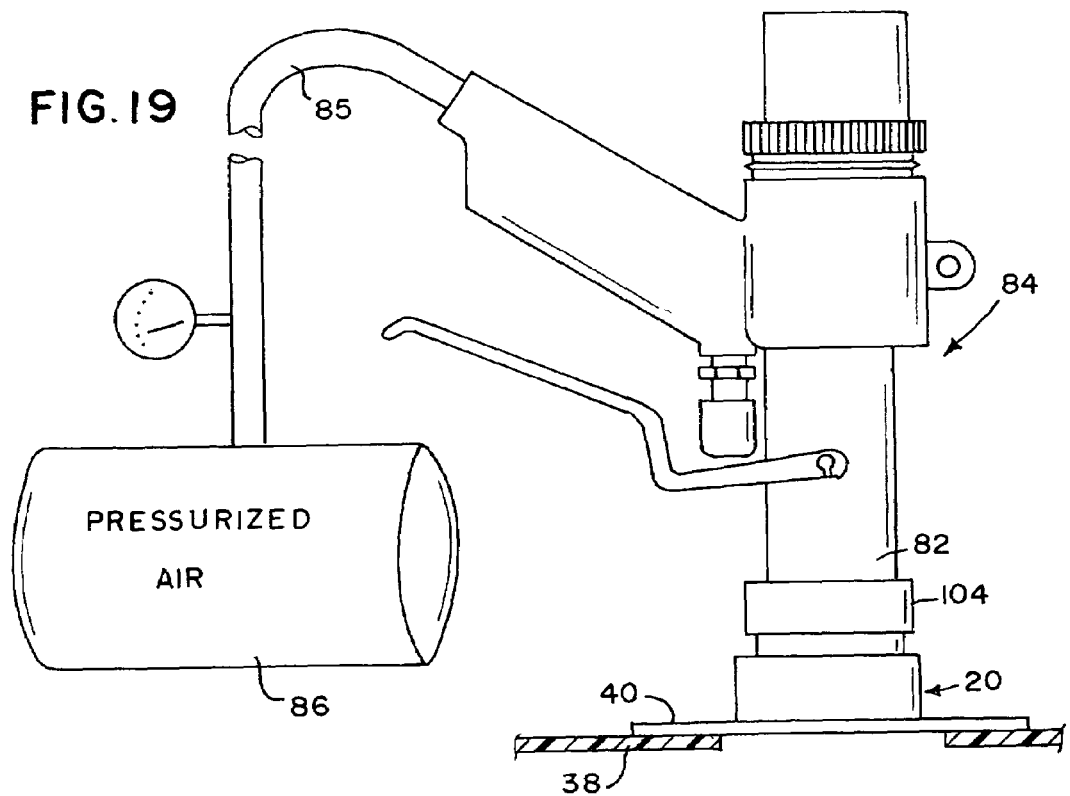

VALVE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO COMPACT DISC(S)

Not applicable.

BACKGROUND OF THE INVENTION

1. Field of the Invention

The present invention relates, in general, to valves, and in particular, to a valve for use with low-pressure inflation by a fluid such as, for example, air.

2. Description of Related Art

It is often desired to have a valve for allowing the inflation of a container or vessel such as a cargo dunnage air bag or an air mattress, etc. Air-filled cargo dunnage bags are often used to cushion and stabilize cargo during shipment, and, because it is desirable to minimize the weight of the cargo, the dunnage bags are constructed with very thin walls of plastic material. Such thin walls of plastic material are very susceptible to frictional "burning" if air is injected at high force through a valve into the vessel against the plastic material. Prior art air valves are known that have a spring-loaded valve stem in which the valve is opened by forcing air under pressure against a valve closure plate of the valve stem so as to operate in opposition to the spring-loaded valve stem and open the valve. Such prior art air valves are unsuitable for low-pressure inflation, which has difficulty in opening a spring-loaded valve stem. Other air valves are known that have a flap on the interior of the vessel that close against the valve bore to seal the valve. Such valves are undesirable in that a finger or other object must be inserted through the valve bore to open the flap in order to permit deflation, and the inflating air pressure must be sufficiently high to cause the flap to open. Still other air valves are known that do not have a valve stem but simply use a cap on the exterior of the vessel to seal the valve. Such cap-sealing air valves are undesirable in that they permit air to escape when inflation ceases and while the cap is being sealingly secured onto the valve.

It is therefore desirable to have a valve suitable for use with low-pressure inflation that does not have a flap within the interior of the vessel that seals the valve bore and that does not have a spring-loaded valve stem.

A preliminary patentability search in Class 441, Subclass 41; Class 5, Subclass 703; and Class 137, Subclasses 223, 230, 231, 228 and 234.5, produced the following patents, some of which may be relevant to the present invention: Walsh, U.S. Pat. No. 2,390,199 (issued Dec. 4, 1945); Russell, U.S. Pat. No. 2,772,692 (issued Dec. 4, 1956); Di Geambeardino et al., U.S. Pat. No. 2,804,085 (issued Aug. 27, 1957); Silverman et al., U.S. Pat. No. 2,824,570 (issued Feb. 25, 1958); Bogossian et al., U.S. Pat. No. 3,351,081 (issued Nov. 7, 1967); Bogossian et al., U.S. Pat. No. 3,590,851 (issued Jul. 6, 1971); Andreasson, U.S. Pat. No. 3,785,395 (issued Jan. 15, 1974); Sorensen, U.S. Pat. No. 3,983,907 (issued Oct. 5, 1976); Harrison et al., U.S. Pat. No. 4,529,167 (issued Jul. 16, 1985); Pestel, U.S. Pat. No. 6,089,251 (issued Jul. 18, 2000); Lung-Po, U.S. Pat. No. 6,138,711 (issued Oct. 31, 2000); Weinheimer et al., U.S. Pat. No. 6,460,560 (issued Oct. 8, 2002); Chaffee, U.S. Pat. No. 6,508,264 (issued Jan. 21, 2003); and Li, U.S. Pat. No. 6,622,749 (issued Sep. 23, 2003).

Walsh, U.S. Pat. No. 2,390,199, discloses an air valve having a threaded insert that is threadedly received inside a valve bore, and the insert moves downwardly against a rubber sealing ring to seal the valve bore.

Russell, U.S. Pat. No. 2,772,692, discloses an air valve having a threaded insert that is threadedly received inside a valve bore, and a rubber gasket of the insert moves upwardly against a valve seat to seal the valve bore.

Di Geambeardino et al., U.S. Pat. No. 2,804,085, and Silverman et al., U.S. Pat. No. 2,824,570, disclose a valve insert wherein an insert threadedly received within a valve body lifts from a valve seat to allow air to pass through holes in the insert and thereby flow through the valve.

Bogossian et al., U.S. Pat. No. 3,351,081, and Bogossian et al., U.S. Pat. No. 3,590,851, disclose a spring-loaded check valve in which a spring biases a valve insert so that an O-ring seals against a valve seat. The present invention has no such biasing spring.

Andreasson, U.S. Pat. No. 3,785,395, discloses a valve having a valve disc forced against a valve seat by internal pressure in a vessel. The present invention has no such valve disc forced against a valve seat by internal pressure within the vessel.

Sorensen, U.S. Pat. No. 3,983,907, discloses a valve insert threadedly received into a bore of a threaded valve body, and the valve insert opens the bore as the insert is screwed into the vessel. However, the insert is received into the bottom of the bore from inside the vessel rather than being received into the top of the bore.

Harrison et al., U.S. Pat. No. 4,529,167, discloses a threaded valve stem received within a threaded valve bore of a valve body. As the valve stem moves upward within the valve body, an O-ring gasket disengages from a valve seat, allowing air to flow from a vessel and through holes in the valve stem and then out an axial bore in the valve stem.

Pestel, U.S. Pat. No. 6,089,251, discloses a valve in which a clack seals against a valve seat from the underside.

Lung-Po, U.S. Pat. No. 6,138,711, discloses a valve in which a flap seals against the underside of a valve seat. The present invention has no such flap.

Weinheimer et al., U.S. Pat. No. 6,460,560, discloses a valve having an insert cap with a one-way sealing flapper on the underside of the cap. The present invention has no such flapper.

Chaffee, U.S. Pat. No. 6,508,264, discloses a valve having a self-sealing flexible diaphragm that seals the underside of the valve. The present invention has no such self-sealing flexible diaphragm that seals the underside of the valve.

Li, U.S. Pat. No. 6,622,749, discloses a valve with a spring-loaded insert that presses a valve cock against a valve seat. The present invention is not spring loaded.

Additionally, Langston, U.S. Pat. No. 5,111,838 (issued May 12, 1992), discloses a dunnage bag air valve and coupling in which a valve stem is spring-loaded to close the valve; and Krier et al., U.S. Pat. No. 5,082,244 (issued Jan. 21, 1992), discloses a cargo air bag inflation valve and inflator combination in which a valve stem is spring-loaded to close the valve.

None of these references, either singly or in combination, disclose or suggest the present invention.

BRIEF SUMMARY OF THE INVENTION

The present invention is a valve with coupling especially suited for low-pressure inflation of a vessel by a fluid such as, for example, air, in which, in contrast to the prior art, the valve stem insert is not spring loaded and in which there is no valve flap that closes the valve as pressure is exerted from inside the vessel.

The valve has a valve stem insert that reciprocates between a valve-opened and a valve-closed position as the valve stem insert is rotated with respect to the body of the valve. When the valve stem insert is rotated in one direction, the valve stem insert reciprocates away from the vessel into the valve-closed position in which a gasket seals the valve closure plate against a valve seat adjacent the underside of the valve body. When the valve stem insert is rotated in the other direction, the valve stem insert reciprocates toward the vessel into the valve-opened position and the valve opens as the gasket unseals the valve closure plate from the valve seat adjacent the underside of the valve body. An enlarged throat and passageway through the valve, the absence of a biasing spring in the valve, and a valve closure plate with a raised center portion together make the valve especially suited to low-pressure inflation of a vessel.

A coupling is provided that engages with the valve body for rotation with respect thereto and that simultaneously engages with the valve stem insert for mutual rotation therewith about the axis of the valve stem insert so as to move the valve stem insert between the valve-closed and valve-opened positions as the coupling is rotated with respect to the valve body while engaged therewith.

It is an object of the present invention to provide a springless valve for inflation and deflation of a vessel, and also to provide a coupling for connecting the valve to a source of fluid, with the coupling, as it engages and disengages with the valve body, causing the valve stem insert to move between the valve-closed and valve-opened positions and vice versa.

BRIEF DESCRIPTION OF THE SEVERAL VIEWS OF THE DRAWING

FIG. 1 is a perspective view of the valve of the present invention with the parts separated before assembly.

FIG. 2 is a perspective sectional view of the valve of the present invention, taken along a diameter of the valve, with the parts separated before assembly.

FIG. 3 is a side view of the valve stem insert of the valve with the gasket removed.

FIG. 4 is a top plan view of the valve stem insert of the valve, taken along the line 4—4 shown in FIG. 3.

FIG. 5 is a side sectional view of the valve of the present invention, taken along a diameter of the valve, with the valve stem insert shown in the closed position.

FIG. 6 is a side sectional view of the valve of the present invention, taken along a diameter of the valve, with the valve stem insert shown in the opened position.

FIG. 7 is a perspective view of the coupling of the present invention.

FIG. 8 is a top plan view of the coupling of the present invention.

FIG. 9 is a side sectional view of the coupling of the present invention, taken along the line 9—9 shown in FIG. 8.

FIG. 10 is a side sectional view similar to FIG. 5 but with the coupling inserted onto the valve and taken along a diagonal 45 degrees rotated from that of FIG. 5.

FIG. 11 is a side sectional view similar to FIG. 6 but with the coupling inserted onto the valve and taken along a diagonal 45 degrees rotated from that of FIG. 6.

FIG. 12 shows a hand-actuated filler valve schematically connected to a source of pressurized air, with the coupling of the present invention attached to the nozzle of the hand-actuated filler valve and with the coupling being inserted onto the valve of the present invention.

FIG. 13 is a perspective view of an alternate embodiment of the coupling of the present invention, showing how a threaded fitting of an air hose attaches to the coupling.

FIG. 14 is a view an alternate hand-actuated filler valve schematically connected to a source of pressurized air, with the alternate embodiment coupling shown in FIG. 13 attached to the threaded fitting of the air hose of the alternate hand-actuated filler valve and with the coupling being inserted onto the valve of the present invention.

FIG. 15 is a top plan view of a third embodiment coupling of the present invention.

FIG. 16 is a perspective view of the third embodiment coupling of the present invention.

FIG. 17 is a side sectional view of the third embodiment coupling of the present invention, taken along a diameter.

FIG. 18 is a side sectional view similar to FIG. 10 but with the third embodiment coupling inserted onto the valve.

FIG. 19 is similar to FIG. 12 and shows a hand-actuated filler valve schematically connected to a source of pressurized air, but with the third embodiment coupling of the present invention attached to the nozzle of the hand-actuated filler valve and with the third embodiment coupling being inserted onto the valve of the present invention.

DETAILED DESCRIPTION OF THE INVENTION

Referring to FIGS. 1–11, the valve 20 of the present invention includes a valve body 22 and a valve stem insert 24 mounted for reciprocation within the valve body 22 as the valve stem insert 24 is screwingly rotated with respect to valve body 22. As valve stem insert 24 is screwingly rotated with respect to valve body 22, valve stem insert 24 reciprocates between a valve-closed position shown in FIG. 5 and a valve-opened position shown in FIG. 6. Preferably valve stem insert 24 is turned clockwise with respect to valve body 22 (as viewed from the top) to cause valve stem insert 24 to move from the valve-closed position to the valve-opened position, and counter-clockwise to cause valve stem insert 24 to move from the valve-opened position to the valve-closed position, but either direction of rotation shall be understood to be possible for opening/closing the valve depending on the orientation of threads 42 hereinafter described. Valve stem insert 24 includes a valve closure plate 26 adjacent its distal end 28, and valve 20 further includes gasket means 30 for sealing valve stem insert 24 to a valve seat 31 of valve body 22. Preferably, this sealing by gasket means 30 of valve stem insert 24 to valve seat 31 is by sealing the periphery of valve closure plate 26 to valve seat 31 adjacent the underside of valve body 22. Preferably, gasket means 30 is a rubber "O-ring" 32 that is received into a semi-circular concave recess 34 around the periphery 36 of valve closure plate 26 of valve stem insert 24. It should be understood, however, that gasket means 30 could instead be a gasket secured to valve body 22 for being engaged by valve closure plate 26 as by, for example, having gasket means be an O-ring secured to the valve body by being received within or adjacent to the valve seat, the essential feature being that gasket means 30 seals insert 24 to valve seat 31 when the insert is in the valve-closed position.

It should be noted that a preferable feature of the present invention is that O-ring 32 retains valve stem insert 24 within valve body 22 and prevents removal of valve stem insert 24 from valve body 22. To assemble the valve of the present invention, valve stem insert 24, with O-ring 32 removed, is inserted into the top of the throat of valve body 22 as shown in FIG. 1. Valve stem insert 24 is then screwingly rotated with respect to valve body 22 so as to move fully into the valve-opened position, and then O-ring 32 is stretchingly placed about the periphery of valve closure plate 26 and received into concave recess 34, where it is retained by the elastic property of O-ring 32 as shown in FIG. 6. O-ring 32, as it engages with valve seat 31, prevents removal of valve stem insert 24 from valve body 22.

Valve body 22 is adapted to be mounted to a wall 38 of a vessel such as, for example, a cargo dunnage air bag or an air mattress, etc., as by a flange 40 extending from valve body 22. Flange 40 is sealed to wall 38 by any means well-known to those skilled in the art such as by glue or by thermal welding, etc. Valve body 22 has a passageway 41 therethrough between the interior and exterior of the vessel, and valve body 22 has threads 42 therein adjacent passageway 41. Valve stem insert 24 has a plurality of vanes 44 upstanding from valve closure plate 26, and valve stem insert 24 is threadedly engaged with threads 42 preferably by fingers 46 respectively extending radially from each vane 44 and threadedly engaged with threads 42. When in the valve-opened position, a fluid such as air or water, etc., may enter or exit the vessel along paths 47 through passageway 41 through the valve 20, as seen best in FIG. 6. Preferably, the walls of vanes 44 are tapered toward the top 49 to be thin thereat so as not to impede the passage of the inflating fluid therepast.

Each of threads 42 preferably has three portions, namely, a substantially horizontal first portion 48 in which fingers 46 rest when valve stem insert 24 is in the valve-closed position so as to maintain valve stem insert 24 in the valve-closed position; an angled intermediate or second portion 50 in which fingers 46 move as valve stem insert 24 moves between the valve-closed position and the valve-opened position; and a substantially horizontal third portion 52 in which fingers 46 rest when valve stem insert 24 is in the valve-opened position so as to maintain valve stem insert 24 in the valve-opened position. Preferably, second portion 50 of threads 42 is at a steep acute angle 54 with respect to the horizontal so that valve stem insert 24 can move from the valve-closed position to the valve-opened position by only a quarter-turn rotation of valve stem insert 24 about its axis 56.

So as to deflect the air entering into the throat 58 of valve body 22 into the vessel and away from the remote walls of the vessel, thereby minimizing "burning" of the walls of the vessel, valve closure plate 26 is preferably dome-shaped with a raised center portion 60.

Preferably provided in combination with valve 20 is a coupling for connecting valve 20 to a source of fluid such as air or water, etc., for inflating the vessel. A first embodiment of the coupling is coupling 62 shown in FIGS. 7–12, and a second embodiment of the coupling is coupling 64 shown in FIGS. 13–14, and a third embodiment of the coupling is coupling 104 shown in FIGS. 15–19. The first two embodiments 62, 64 of couplings are substantially similar, with the difference being how the couplings interface to an air supply, so a description of coupling 62 will generally suffice for both, and only the differences between the two couplings will be described in connection with coupling 64. The third embodiment coupling 104 is a modified version of the first embodiment coupling 62, and the differences between the two will be explained in detail hereinbelow.

Coupling 62 is preferably generally cylindrical for surrounding valve body 22, having a cylindrical outer wall 63, and is adapted for mating engagement with valve body 22 and, when engaged with valve body 22, is rotatable with respect to valve body 22 about the axis 56 of valve stem insert 24. Valve body 22 has external flanges 66 that engage with inwardly-extending flanges 68 on the inside of wall 63 of coupling 62. The flanges of valve body 22 have gaps 70 through which flanges 68 of coupling 62 pass as coupling 62 is urged downwardly onto valve body 22. As coupling 62 is rotated about axis 56 with respect to valve body 22, flanges 66 and 68 become mutually engaged, thereby engagingly holding coupling 62 to valve body 22 when valve stem insert 24 is not in the valve-closed position. When valve stem insert 24 is in the valve-opened position, gaps 70 are aligned with flanges 68 of coupling 62 so that coupling 62 can be removed from and inserted onto valve body 22.

Coupling 62 is further adapted for mutually-rotating engagement with valve stem insert 24 for mutual rotation therewith about axis 56 when the flanges 68 of coupling 62 are matingly engaged with flanges 66 of valve body 22. The engagement of coupling 62 with valve stem insert 24 is preferably by a plurality of downwardly-extending tabs 72 that matingly engage with vanes 44 of valve stem insert 24 as by slots 74 between tabs 72 into which vanes 44 are received as coupling 62 is received onto valve body 22, thereby causing each vane 44 to be entrapped in a slot 74 between two adjacent tabs 72. As valve stem insert 24 reciprocates between the valve-closed position shown in FIG. 10 and the valve-opened position shown in FIG. 11, vanes 44 reciprocate within slots 74 as shown, while still remaining at least partially within slots 74 for engagement with tabs 72.

Coupling 62 has an axially-disposed bore 76 therethrough, and the distal end 78 of coupling 62 has an enlarged bore portion 80 for receiving the nozzle 82 of an air-dispensing gun such as gun 84. Gun 84 is connected as through a well-known hose 85 to source of air 86, and a trigger-operated valve 88 in gun 84 selectively permits air to flow from air source 86 through gun 84. A suitable gun 84 for use with the present invention is a well-known air gun sold under the trademark Hand-E-Vac, catalog number 2001, made by ITW Vortec, an Illinois Tool Works Company, 10125 Carver Rd., Cincinnati, Ohio 45242-4798. This lightweight gun is preferred for use with the present invention because, by removing the rear portion 90 and reversing an internal Bernoulli-effect insert within gun 84 and then replacing rear portion 90, the gun can permit rapid inflation or deflation of the vessel using the same pressurized air source 86. The nozzle 82 of gun 84 is received within the enlarged bore portion 80 of coupling 62 and thus inflates or deflates the vessel through bore 76 of coupling 62 and passageway 41 through valve 20 when valve stem insert 24 is in the valve-opened position.

Second embodiment coupling 64 is substantially similar to coupling 62 except that coupling 64, rather than having an enlarged bore portion 80, instead has a threaded bore portion 92 into which a threaded fitting 94 of an air hose 96 is threadedly received. Air hose 96 may be connected to a pressurized air source 86 through an air hose 85 with a well-known handgrip lever-operated valve 98 interposed between air hoses 85 and 96. Preferably, handgrip lever-operated valve 98 may include an air pressure indicator 100 for indicating the inflating air pressure. A suitable handgrip lever-operated valve 98 for use with the present invention is the Shippers Fastfill Combination Inflator Kit (including model numbers 163097 (valve body), 088414 (air gauge element), and 163078 (swivel hose assembly)) made by ITW Shippers Products, an Illinois Tool Works Company, 1203 North Main St., P.O. Box 69, Mt. Pleasant, Tenn. 38474.

Third embodiment coupling 104 has many similarities to couplings 62 and 64. Like coupling 62, coupling 104 has an enlarged bore portion 106 for receiving the nozzle 82 of an air-dispensing gun such as gun 84, which was fully described hereinabove and which has an internal reversible Bernoulli-effect insert for causing gun 84 to inflate or deflate through coupling 104. As before, gun 84 is connected as through a well-known hose 85 to source of air 86. The nozzle 82 of gun 84 is received within the enlarged bore portion 106 of coupling 104 and thus inflates or deflates the vessel through bore 108 of coupling 104 and passageway 41 through valve 20 when valve stem insert 24 is in the valve-opened position.

Third embodiment coupling 104 is preferably generally cylindrical and is adapted for mating engagement into valve body 22 and, when engaged into valve body 22, is rotatable with respect to valve body 22 about the axis 56 of valve stem insert 24. Coupling 104 differs from coupling 62 in that coupling 104 does not have an external outer wall corresponding to external outer wall 63 of coupling 62. As is the case with coupling 62, coupling 104 is adapted for mutually-rotating engagement with valve stem insert 24 for mutual rotation therewith about axis 56. The engagement of coupling 104 with valve stem insert 24 is preferably by a plurality of downwardly-extending tabs 110 that matingly engage with vanes 44 of valve stem insert 24 as by slots 112 between tabs 110 into which vanes 44 are received as coupling 104 is received into valve body 22, thereby causing each vane 44 to be entrapped in a slot 112 between two adjacent tabs 110. To facilitate quick and easy alignment of coupling 104 with vanes 44, slots 112 are provided at forty-five degree intervals about coupling 104 so that coupling 104 (and gun 84 attached thereto) need be turned at most plus or minus 22.5 degrees to become aligned with vanes 44. Unlike couplings 62 and 64, which have flanges 66 that engage with flanges 68 of valve body 22, coupling 104, lacking structure corresponding to outer wall 63, is simply forcibly pressed against valve 20, with vanes 44 engaging slots 112 during inflation (and deflation, if desired). As valve stem insert 24 reciprocates between the valve-closed position shown in FIG. 18 and the valve-opened position in a manner described hereinabove, vanes 44 remain engaged within slots 112 between tabs 110 as shown because of the forcible pressing of coupling 104 against valve 20.

Coupling 104 has advantages over couplings 62 and 64. First, with coupling 104, valve 20 can remain in the valve-opened position prior to inflation of the vessel because, unlike couplings 62 and 64, coupling 104 can become engaged and disengaged with valve 20 regardless of whether valve 20 is in the valve-opened or valve closed position, thereby allowing dunnage bags with valve 20 to be stored in the valve-opened position. Second, coupling 104 is more easily aligned with vanes 44 because it does not have flanges 66 of couplings 62 and 64 that can only engage with flanges 68 of valve body 22 in certain orientations. As with couplings 62 and 64, once the vessel is inflated to a desired pressure, coupling 104 is rotated about its axis while slots 112 are engaged with vanes 44 so as to cause valve 20 to enter the valve-closed position in a manner heretofore described. It should be understood that third embodiment coupling 104 could be readily modified to have a threaded bore portion similar to threaded bore portion 92 of second embodiment coupling 64 so as to connect to the pressurized air source in a manner like coupling 64.

Couplings 62, 64, and 104, as well as valve body 22 and valve stem insert 24 may be made of any suitably rigid material, preferably material that can be molded such as plastic.

To use valve 20, the flanges 40 of valve 20 must be affixed to the wall 38 of the vessel. Coupling 62 or 64 or 104, as appropriate, is connected to a source of fluid such as pressurized air source 86 through an appropriate gun or valve such as gun 84 or valve 98 heretofore described. The coupling is placed down onto valve 20 as heretofore described and as shown in FIG. 10 and then rotated with respect to valve body 22 about axis 56, thereby causing valve stem insert 24 to move from the valve-closed position into the valve-opened position as the coupling is rotated with respect to valve body 22. The vessel can now be inflated in a manner that will be apparent to those skilled in the art. When the vessel has achieved the desired degree of inflation, the coupling is then rotated about axis 56 in the reverse direction with respect to valve body 22, thereby causing valve stem insert to move from the valve-opened position into the valve-closed position. To deflate the vessel, valve stem insert 24 can either be manually rotated as by gripping the vanes 44 with one's fingers or else gun 84 can be used in its deflator mode with coupling 62 secured to valve body 22 or with coupling 104 so as to provide rapid deflation of the vessel.

Although the present invention has been described and illustrated with respect to a preferred embodiment and a preferred use therefor, it is not to be so limited since modifications and changes can be made therein which are within the full intended scope of the invention.

I claim:

1. A valve comprising:
   (a) a valve body, said valve body having a passageway therethrough, said valve body being adapted to be mounted to a wall of a vessel, said passageway being between an interior and exterior of said vessel; said valve body having threads therein adjacent said passageway; said valve body having a valve seat;
   (b) a valve stem insert threadedly engaged with said threads of said valve body and being movably mounted for reciprocation within said valve body between a valve-closed position and a valve-opened position as said insert is rotated with respect to said valve body; and
   (c) gasket means for sealing said insert to said valve seat when said insert is in said valve-closed position, said gasket means also preventing removal of said insert from said valve body.

2. The valve as recited in claim 1, in which said insert has a recess around a periphery thereof, and said gasket means is an O-ring received within said recess.

3. The valve as recited in claim 1 in which said insert includes a valve closure plate adjacent a distal end of said insert, said valve closure plate having a periphery with a recess therearound, and said gasket means is an O-ring received within said recess.

4. The valve as recited in claim 3, in which said valve closure plate has a raised center portion.

5. The valve as recited in claim 3, in which said insert has at least one vane upstanding from said valve closure plate.

6. The valve as recited in claim 5, in which said at least one vane has a finger engaging said threads of said valve body.

7. The valve as recited in claim 6, in which said valve closure plate has a raised center portion.

8. In combination with the valve as recited in claim 3, a coupling for connecting said valve to a source of fluid, said coupling being adapted for engagement with said valve body and being rotatable about an axis with respect to said valve body when engaged therewith, said coupling further being adapted for mutually-rotating engagement with said insert when said coupling is engaged with said valve body.

9. The combination as recited in claim 8, in which said insert has at least one vane upstanding from said valve closure plate.

10. The combination as recited in claim 9, in which said at least one vane has a finger engaging said threads of said valve body.

11. The combination as recited in claim 10, in which said coupling has tabs adapted for engagement with said at least one vane so that rotation of said coupling with respect to said valve body about said axis causes said insert to mutually rotate with said coupling.

12. The combination as recited in claim 10, in which said coupling and said valve body each have flanges for mutual engagement to couple said coupling to said valve body while said valve is in said valve-closed position, said coupling further having tabs adapted for engagement with said at least one vane so that rotation of said coupling with respect to said valve body about said axis causes said insert to mutually rotate with said coupling.

* * * * *